United States Patent [19]

Shaw

[11] Patent Number: 4,502,390
[45] Date of Patent: Mar. 5, 1985

[54] SELF-ELEVATING ACUTE TURN GUIDE HOSE HAULER VEHICLE

[75] Inventor: Ricky L. Shaw, Bethel Park, Pa.

[73] Assignee: Conoco Inc., Ponca City, Okla.

[21] Appl. No.: 354,333

[22] Filed: Mar. 3, 1982

[51] Int. Cl.³ .............................................. B61F 9/00
[52] U.S. Cl. .................................... 104/245; 104/242;
137/355.16; 198/864; 248/421; 254/133 R;
406/40
[58] Field of Search ........ 104/118, 119, 242, 245–247;
198/302, 303, 862, 864; 406/38–40; 193/42;
137/899.1, 355.16, 355.17; 248/352, 421;
254/126, 133 R, DIG. 1

[56] References Cited

U.S. PATENT DOCUMENTS

| | | | |
|---|---|---|---|
| 2,633,974 | 4/1953 | Jackson | 198/303 |
| 2,733,806 | 2/1956 | Lanier | 198/303 |
| 3,258,108 | 6/1966 | Cowlishaw | 198/862 |
| 3,372,792 | 3/1968 | Lobbe | 198/862 |
| 3,556,478 | 1/1971 | Rausch | 193/42 X |
| 3,664,486 | 3/1972 | Mares | 198/862 |
| 3,895,644 | 7/1975 | Umphrey | 137/899.1 |
| 3,902,431 | 4/1974 | McCain | 104/246 |
| 3,920,039 | 11/1975 | Jamison | 137/899.1 |
| 3,921,534 | 4/1974 | Umphrey | 104/247 |
| 4,092,012 | 5/1978 | Ishigami | 254/126 |
| 4,261,460 | 4/1981 | Peterson | 198/862 |

*Primary Examiner*—Randolph Reese
*Attorney, Agent, or Firm*—William J. Miller

[57] ABSTRACT

Apparatus and method for moving a hose hauler apparatus through an arc includes a pressure plate which is anchored in a manner to secure the pressure plate at a fixed location on the surface of the earth. An elevating apparatus is attached to the pressure plate. The elevating apparatus can be raised or lowered and has a platform on its upper surface. A linkage capture apparatus is attached to the platform. In use the device is inserted under a hose hauler, anchored and the linkage capturing apparatus is raised until the linkage is secured. Several of the devices are placed as required to initiate desired arcuate deviation in the hose hauler.

1 Claim, 3 Drawing Figures

SELF-ELEVATING ACUTE TURN GUIDE HOSE HAULER VEHICLE

DISCUSSION OF THE PRIOR ART

The best prior art known to Applicant is a group of patents assigned to the same assignee as this invention relating to apparatus for turning a hose hauler through an arcuate deviation. For example, U.S. Pat. No. 3,895,644 shows the placement on the ground of a plurality of tension, pie-shaped platforms having rollers to engage the linkages and secure the linkage against side to side movement, thereby forcing the hose hauler to traverse the turn.

U.S. Pat. No. 3,902,431 discloses a plurality of members which are attached to the ground and have "c" channels which capture a roller attached to the linkage. In this manner the linkage is secured throughout the turn.

U.S. Pat. No. 3,921,534 is a patent which is the closest teaching in the prior art and illustrates a platform which is secured to the ground or mine floor and has attached thereto a plurality of rollers which engage or capture the linkage.

The first two-mentioned patents must be placed on the ground after the hose hauler has been guided around the turn to be negotiated. The hose hauler is then lifted off the ground by jacks and the turn guide placed under the hose whereupon the hauler is lowered on the turn apparatus.

If the turn guide is placed in segments, as is possible in both these patents, then the problem of aligning the linkage capturing apparatus with variations in level of the mine floor has been found to be nearly impossible.

In order to solve the problem, the '534 patent carried the linkage mechanism on the hose hauler itself. This solved the problem of inserting the turn apparatus under the hose hauler but could not solve the problem of maintaining the capturing apparatus at a proper heights.

BRIEF DESCRIPTION OF THE INVENTION

This invention discloses a turn apparatus for a hose hauler which solves all of the previous problems described above by attaching a pressure plate on the mine floor and anchoring the pressure plate to the floor regardless of its deviations in elevation throughout the turn. Once the plate is securely anchored using either roof jacks or pins or both, the linkage capture apparatus is jacked or elevated into position and maintained in that position as the device is used. Thus any deviation in mine floor elevation either due to heaving of the floor, pressure from the hose hauler apparatus or wash out due to the fluid or any other reason can be easily accommodated by merely readjusting the elevating apparatus.

DETAILED DESCRIPTION OF THE INVENTION

Figure 1:
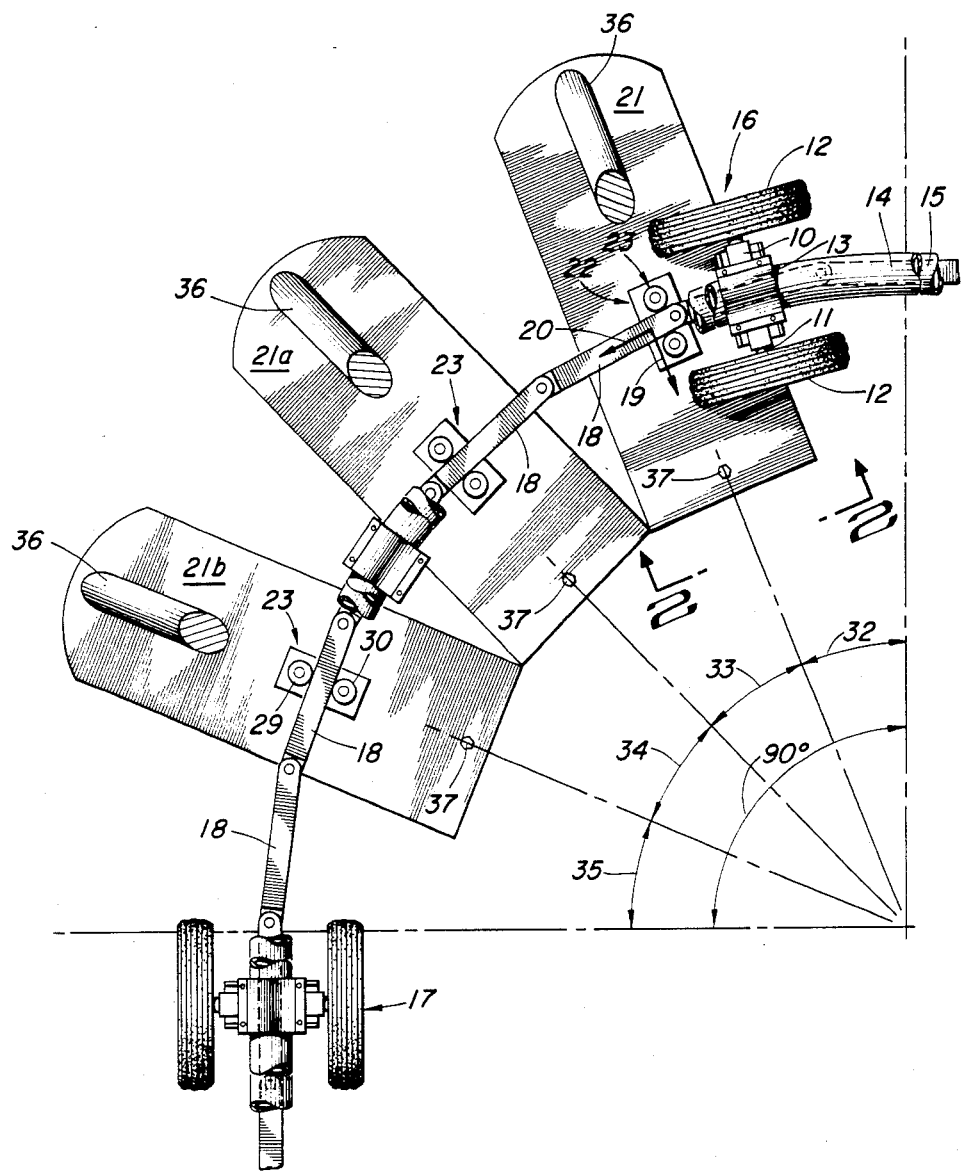
FIG. 1 is a top view of a slurry hose hauler system illustrating the turn apparatus installed.

Referring to all of the figures but in particular to FIG. 1, the top view of a hose hauler is illustrated. Such a hose hauler is well known in the art and will not be described in detail but essentially comprises a carriage 10, axles 11 which have a pair of wheels 12 attached thereto. Attached to carriage 10 is a hose support apparatus 13 which generally is designed to clamp a pair of hoses 14 and 15, for example. Other elements may be clamped to carriage 10, for example, hydraulic hoses, electric lines, and the like. These are not illustrated since they are not involved with the subject matter of this invention.

Figure 2:
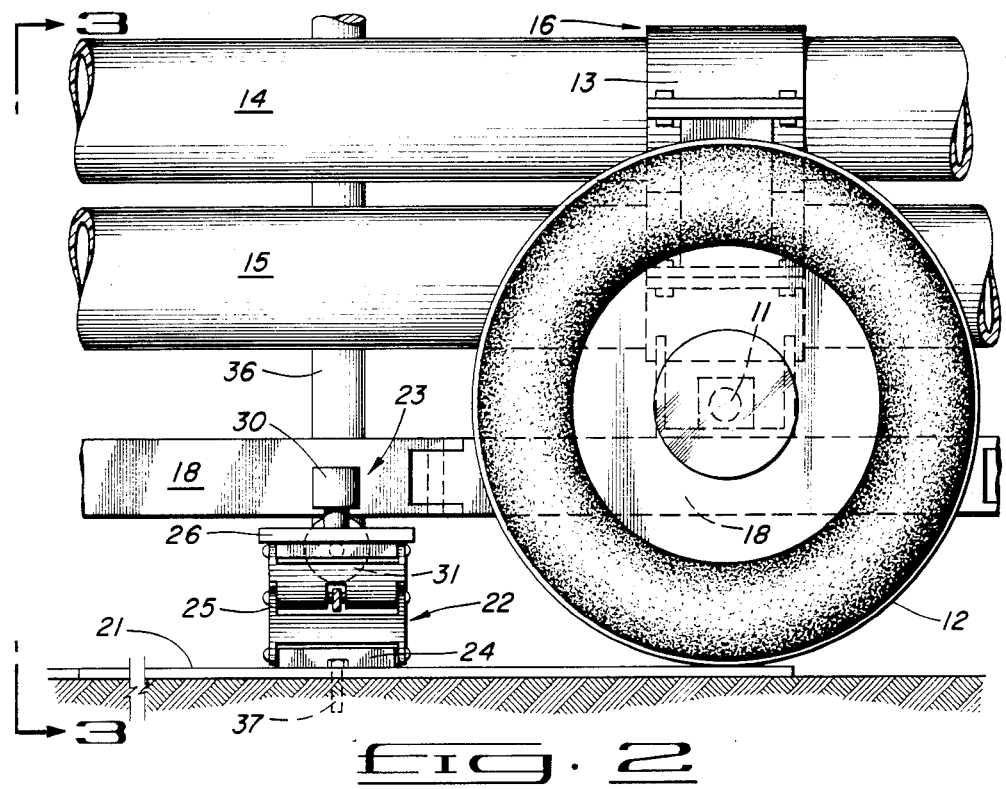
FIG. 2 is a side view of a portion of the apparatus taken through 2—2 of FIG. 1.
Figure 3:
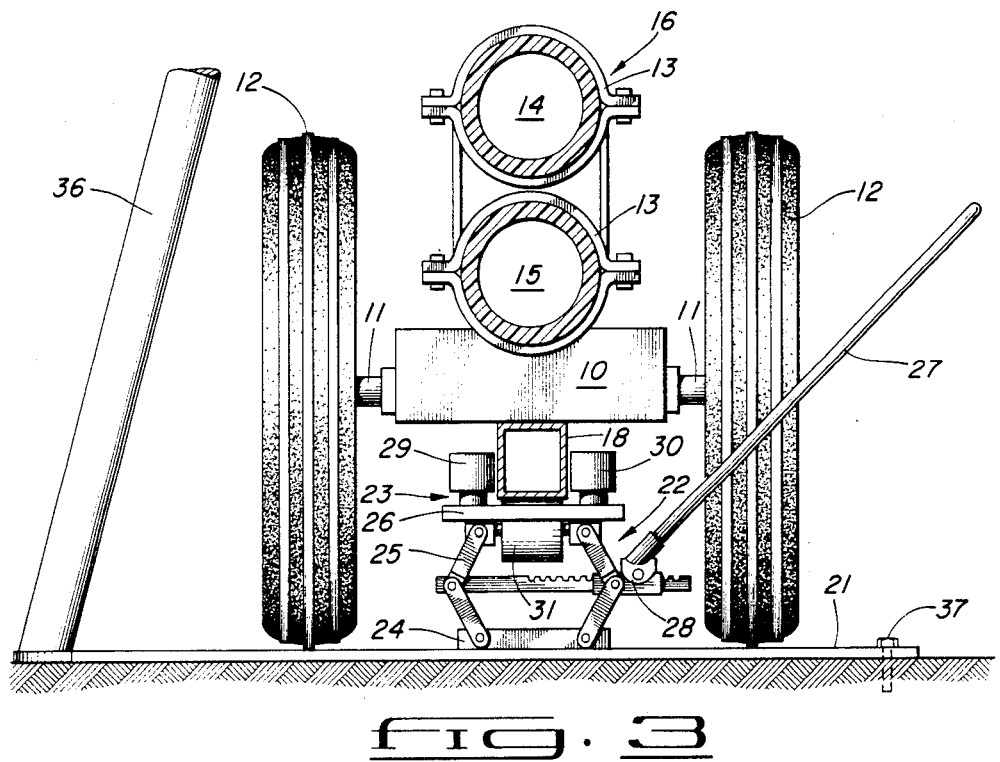
FIG. 3 is an end view taken through lines 3—3 of FIG. 2.

A number of carts, for example 16 and 17, are spaced apart and interconnected by a plurality of linkages 18. The linkages 18 not only are coupled between carts 16 and 17, for example, but also extend under carts 16 and 17 in a continuous manner as illustrated in FIG. 2.

It is obvious that the slurry system can be used for moving material of any nature or size that can be mixed with water and pumped down pipes 14 and 15. In order to best describe the invention, the system will be referred to as being used in coal mining.

Normally, when a mining machine dislodges or removes coal from a certain distance, mining procedure dictates that the coal mining machine or continuous miner change direction and remove coal to one side or the other of perhaps both sides. In order to do this, the slurry hose hauler system must follow the coal miner if it is to properly remove the coal in a continuous manner.

If the miner turns and tension is applied along the axis of linkage 18, a side thrust may be developed where the turn is initiated as, for example, in FIG. 1. The side thrust in the direction of arrow 19, when thrust is applied in the direction of arrow 20, will cause the cart 16 to move in the same direction as arrow 19. Obviously, if tension is being applied in the opposite direction of arrow 20, then the same side thrust of arrow 19 will result. If cart 16 should move in the direction of arrow 19 rather than along the direction of arrow 20, in a short period of time cart 16 would be driven into the wall or tunnel of the mine preventing further movement and damaging the cart. In order to restrain this movement some form of linkage capture means must be inserted in order to restrain it against in the direction or arrow 19. To accomplish this restraint the invention discloses the insertion of a pressure plate 21 at the initiation of the turn. Pressure plate 21 is inserted before cart wheels 16 are in the location illustrated in the drawing and preferably just prior to the period in time when cart 17 would begin rolling on top of pressure plate 21. Once pressure plate 21 is laid under the linkage mechanism, it is oriented so that elevating apparatus generally referred to by arrow 22 is aligned in a manner so that linkage capturing means 23 is oriented under linkage 18. Linkage capturing means assembly 23 generally comprises a base plate 24 which is rigidly attached to pressure plate 21. A jacking or elevating means 25 is attached to base 24 and to platform 26. Jacking or elevating means 25 can be of any type suitable for the environment and may be a mechanical one having a raising or lowering arm 27 as illustrated in the art, and mechanical actuator means 28 to raise and lower platform 26 in the usual manner. The jacking or elevating means can also be a hydraulic piston, if adequate spacing permits, or a screw jack or any other well known elevating apparatus. Platform 26 has mounted thereon a pair of rollers 29 and 30 to capture linkage 18 and restrain it from side thrust 19 (see FIG. 1) and may also include a bottom roller 31 which would be necessary to level the linkage as will be explained in a later portion. As the turn progresses, additional plates 21a and 21b may be inserted, depending upon the number of angles 32, 33, 34 or 35 needed for the particular turn being negotiated by the mining machine. It is obvious, of course, that only one may be needed or more than three may be needed depending upon the number of angles that the slurry system must traverse in order to follow the continuous miner.

Operation

In operation a continuous miner (not illustrated) has attached behind it a slurry hose hauler, a portion of which is illustrated as carts 16 and 17 are interconnected by linkage 18. Normally, hoses 14 and 15 would contain either slurry or water. For example, if hose 14 is carrying slurry and water mixture away from the mining machine, then hose 15 is carrying water to the continuous mining machine. When the mining machine is required by mining plans to form a side room, then the slurry hose hauler must, likewise, turn with the mining machine. As the turn is begun, prior to cart 17 entering the turn, a pressure platform 21 is inserted under linkage 18 so that the linkage capturing means 23 is vertically aligned under linkage 18. Pressure plate 21 is then rigidly secured to the mine floor and anchored by means of a roof jack 36. One or more pins 37 may be inserted as additional anchoring for the pressure plate. Pins 37 would normally pass through the pressure plate and into the mining floor. The pins would normally be driven in far enough to hold the pressure plate against the side thrust created by the linkage, such as force 19. Once the pressure plate is securely anchored, raising or lowering arm 27 is operated in a manner to cause mechanical actuator means 28 to raise platform 28 so that rollers 29 and 30 engage the side of linkage 18 and roller 31 engages the bottom of linkage 18.

As the slurry system continues to turn from angle 32 to angle 33, an additional platform 21a is inserted and anchored in the manner similar to that described by platform 21. Horizontally, however, pressure plate 21a may be above or below pressure plate 21. Since the linkage 18, for best operation, should be maintained at all times in a fairly horizontal plane, it is necessary to elevate linkage capturing means 23 on platform 21a in a manner to maintain linkage 18 horizontal. Thus, roller 31 may need to lift linkage 18 in order to accomplish the above. As cart 17 progresses around the turn through angles 34 and 35, for example, an additional platform 21b will be required. Again its linkage capturing means 23 must be positioned under linkage 18, platform 21b anchored by roof jack 36 and pin 37, and then linkage capturing means 23 elevated in order to maintain linkage 18 fairly horizontal.

As the cart progresses to the location shown in FIG. 1, further adjustment of linkage capturing means 23 may be required so that the linkage 18 does not either lift out from between rollers 29 and 30 or cause excessive pressure against roller 31 (not illustrated in FIG. 1).

Conclusions

The arcuate turn guide illustrated in this invention has many advantages over that previously attempted in the prior art. It is easy to install in an operating system in a mine environment without jacking or elevating the slurry hose hauler and easily accommodates various elevation changes in the mine floor during the turn and through a period of time after the turn has been accomplished. It provides an easy method for leveling the linkage during and after the turn in order to reduce the forces on the linkage due to unnatural torquing of the linkage apparatus and to accommodate turns of almost any angle required so that the slurry hose hauler can follow the necessary directional changes in the continuous miner.

It is obvious that changes can be made in the application and still be within the spirit and scope of the invention as disclosed in the specification and appended claims.

What is claimed is:

1. A method for assisting a hose hauler negotiate a change in direction, wherein said hose hauler includes at least a plurality of wheel supported carts which are interconnected by a linkage which also extends under said carts, said method comprising:
    (a) inserting where said change in direction is to be instituted a pressure support plate having a jack supported linkage capture means attached thereto under said linkage between said carts in a manner to position said linkage capture means under said linkage,
    (b) anchoring said pressure support plate,
    (c) raising by said jack, said linkage capture means vertically into engagement with said linkage, restraining said linkage from side to side movement,
    (d) additionally raising said jacking means by an amount necessary to level said linkage means,
    (e) positioning additional pressure plate supported linkage capture means along said change in direction as needed to restrain said linkage, anchoring said additional plates and capturing said linkage with said raised linkage capture means,
    (f) additionally raising said additional pressure plate supported linkage capture means by an amount necessary to level said linkage means, whereby said change in direction of said hose hauler can be stabilized throughout the total length of said hose hauler directional change.

* * * * *